United States Patent [19]
Frean et al.

[11] Patent Number: 5,346,165
[45] Date of Patent: Sep. 13, 1994

[54] RESTRAINING DEVICE

[75] Inventors: Robert G. Frean, 108 Kalamunda Road, Gooseberry Hill; Leslie R. Moss, Denham, both of Australia

[73] Assignee: Robert George Frean, Gooseberry Hills, Australia

[21] Appl. No.: 828,800

[22] Filed: Jan. 29, 1992

[30] Foreign Application Priority Data

Aug. 2, 1989 [AU] Australia .............................. PJ5582
Dec. 11, 1989 [AU] Australia .............................. PJ7812

[51] Int. Cl.$^5$ .............................................. A47G 23/02
[52] U.S. Cl. ................................... 248/146; 248/154; 248/505
[58] Field of Search .................. 248/146, 346, 49, 73, 248/74.2, 500, 505, 910, 154

[56] References Cited

U.S. PATENT DOCUMENTS

| | | | |
|---|---|---|---|
| 1,732,829 | 10/1929 | Boardman | 248/146 |
| 2,870,982 | 1/1959 | Greene et al. | 248/146 |
| 3,894,706 | 7/1975 | Mizusawa | 248/74.2 X |
| 4,150,806 | 4/1979 | Dzivk | 248/154 |
| 4,391,376 | 7/1983 | Finnegan | 248/73 X |
| 4,442,991 | 4/1984 | Levens | 248/146 |
| 4,502,653 | 3/1985 | Curtis, Jr. | 248/74.1 X |
| 4,518,138 | 5/1985 | Stutenkemper et al. | 248/73 |
| 4,555,083 | 11/1985 | Carter | 248/154 X |

FOREIGN PATENT DOCUMENTS

| | | |
|---|---|---|
| 238866 | 3/1960 | Australia . |
| 435073 | 2/1970 | Australia . |
| 3907067 | 9/1990 | Fed. Rep. of Germany ........ 248/49 |
| 165912 | 4/1975 | New Zealand . |
| 2177298 | 6/1986 | United Kingdom ................ 248/146 |

*Primary Examiner*—David A. Scherbel
*Assistant Examiner*—Derek J. Berger
*Attorney, Agent, or Firm*—Harness, Dickey & Pierce

[57] ABSTRACT

A restraining device for restraining a round object (13) from rolling. The restraining device (11) comprises a body (15) having a base (17) for location against a support surface, and an opening (18) capable of expansion and contraction for receiving and clampingly retaining the round object. The base (17) is adapted for and is capable of deformation for maintaining stable contact with the support surface upon expansion and contraction of the opening (18).

13 Claims, 10 Drawing Sheets

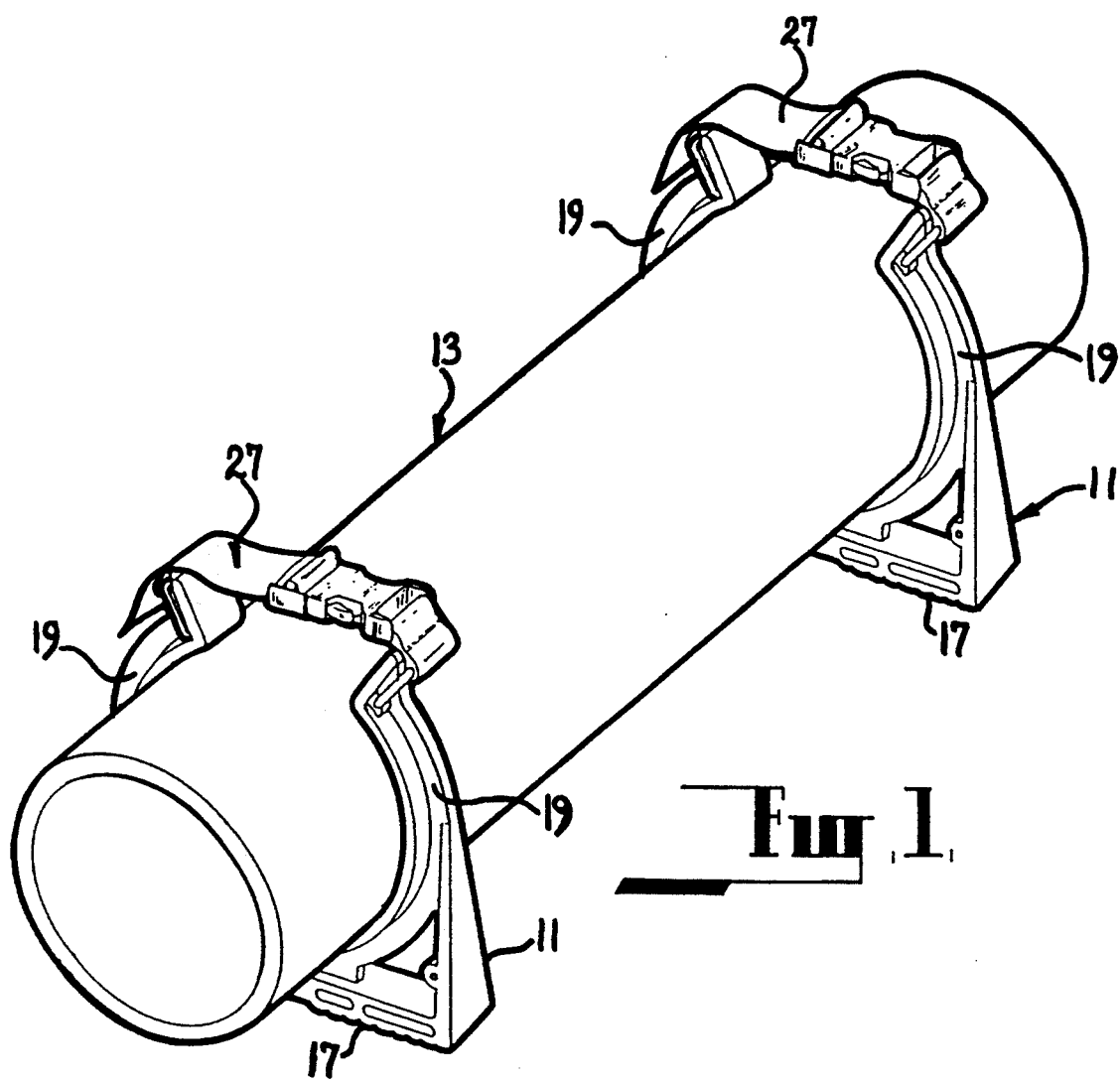

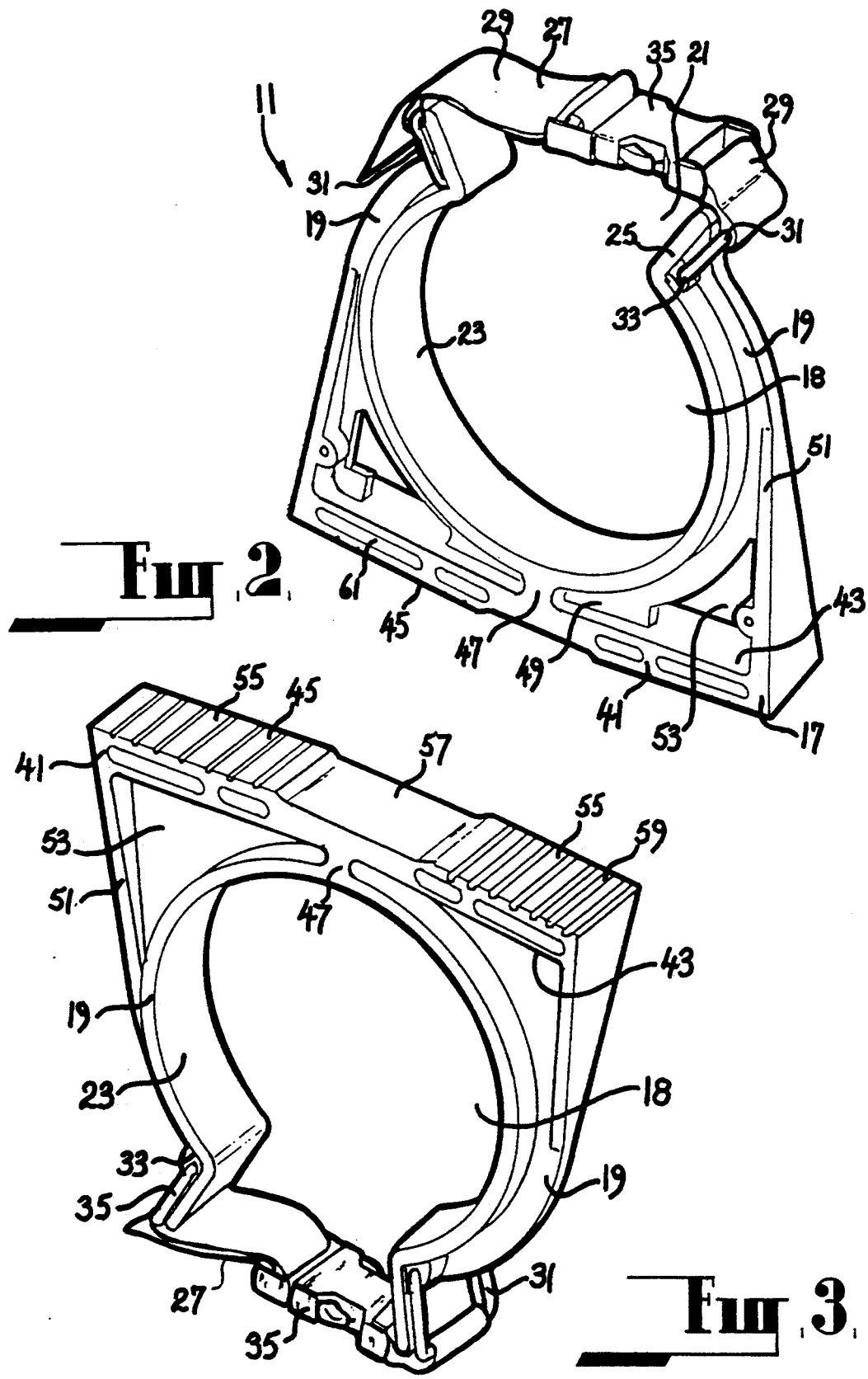

RESTRAINING DEVICE

TECHNICAL FIELD

This invention relates to a restraining device adapted to be positioned on an object to provide at least some restraint against movement of the object.

The invention has been devised particularly, although not solely, for positioning on gas cylinders (such as gas cylinders used in oxyacetylene welding operations) to provide some restrain against movement of such cylinders, particularly during transportation and storage.

BACKGROUND ART

When gas cylinders are transported, they are generally positioned in either an upright position or in a prone position. More particularly, when being transported in a motor vehicle, gas cylinders are generally located in an upright position in a corner of the load carrying area of the motor vehicle and restrained with the aid of chains or ropes. Such an arrangement is not altogether satisfactory as the cylinders may still move and so cause damage to themselves or to the vehicle. Similarly, when transported in a prone position on the load carrying area of the vehicle, the gas cylinders may roll around and cause damage to surrounding parts of the vehicle or themselves.

DISCLOSURE OF INVENTION

The present invention seeks to provide a restraining device adapted to be positioned on an object to provide at least some restraint against movement of the object particularly during transportation and storage.

In one form the invention resides in a restraining device for an object comprising a body having a base for location against a support surface and a pair of side portions extending from said base, said base and said side portions defining an opening capable of expansion and contraction for receiving and clampingly retaining said object, said base being adapted for and capable of deformation for maintaining stable contact with said support surface upon expansion and contraction of said opening, said base and said side portions co-operating to define a clamping ring portion forming the periphery of said opening, said base comprising an elongated base portion and said ring portion being mounted on the inner longitudinal face of said base portion at a region intermediate the ends thereof.

Preferably, said side portions have ends remote from said base which are in spaced apart relationship to define a gap through which said object can be inserted into and removed from said opening, the size of said gap varying with expansion and contraction of said opening.

Preferably, a securing device is provided for releasably securing the free ends of the side portions together.

Preferably, said side portions and said base are formed integrally.

Preferably, said body is made of resiliently flexibly material such as polyurethane.

Preferably, said side portions include a pair of support arms disposed one to each side of said intermediate region of the base portion, each support arm extending from the base portion towards the clamping ring.

Preferably, the outer longitudinal face of said base portion is provided with end sections adapted for engagement with said support surface and an intermediate section disposed between said end sections, said intermediate section being recessed to avoid contact with said support surface upon deformation of said base.

In another form the invention resides in a combination of a restraining device as set forth in any one or more of the preceding paragraphs and a locating means adapted to receive and releasably retain said base of said restraining device, said locating means comprising said support surface.

Preferably, said locating means includes a channel portion for receiving said base portion of said restraining device.

BRIEF DESCRIPTION OF THE DRAWINGS

The invention will be better understood by reference to the following description of two specific embodiments thereof as shown in the accompanying drawings in which:

FIG. 1 is a perspective view of two restraining devices according to the first embodiment positioned on a gas cylinder for the purpose of restraining the gas cylinder from rolling;

FIG. 2 is a perspective view from the upper side of a restraining device according to the first embodiment;

FIG. 3 is a perspective view from the underside of the restraining device;

BEST MODES OF CARRYING OUT INVENTION

Figure 4:
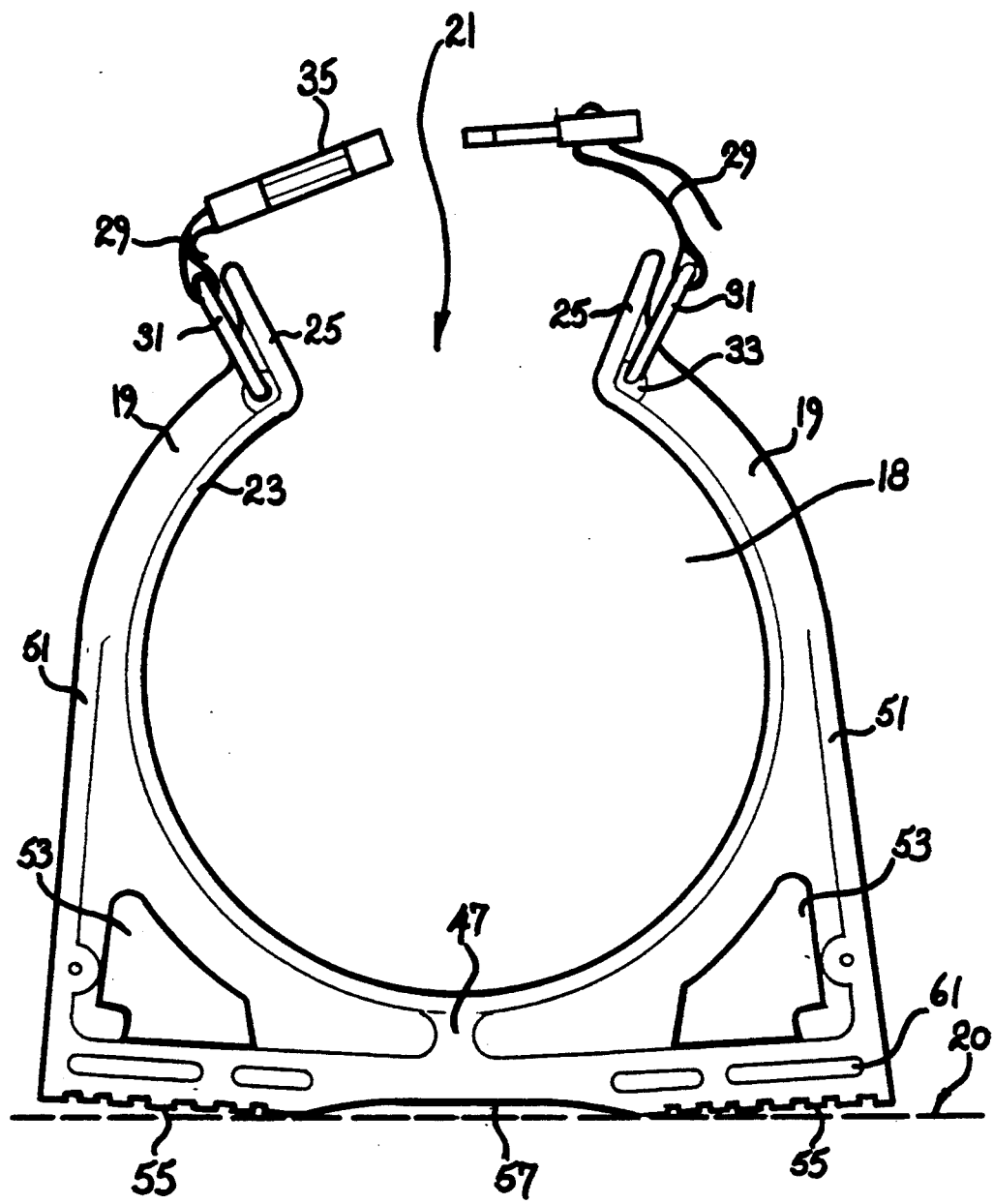
FIG. 4 is a front elevational view of the restraining device.

The first embodiment, which is shown in FIGS. 1 to 7 of the accompanying drawings, is directed to a restraining device adapted to be fitted onto a gas cylinder of the type used in oxyacetylene welding procedures to ensure safe handling of the cylinders particularly during transportation and storage. The restraining device functions to restrain rolling of the cylinder when it is transported in a prone position as illustrated in FIG. 1 of the drawings. The restraining device can also be employed to restrain movement of a gas cylinder being transported in an upright position.

In the drawings, the restraining device is indicated generally by reference numeral 11 and the gas cylinder onto which it is fitted is indicated generally by reference numeral 13.

The restraining device 11 comprises a body 15 of polyurethane or other suitable elastomeric material. The body 15 comprises a base 17 for location against a support surface 20 (such as the load carrying tray of a vehicle or a side wall of such a tray). A pair of side portions 19 extend to one side of the base and are formed integrally with the base.

The free ends of the side portions 19 define a gap 21 in the body 15 through which the gas cylinder can pass when the restraining device is being fitted onto, or removed from, the restraining device.

The clamping opening 18 is defined between the base 17 and the side portions 19 of the body 15. More particularly, the base 17 and side portions 19 of the body co-operate to define clamping ring portion 23 which forms the periphery of said opening 18. The clamping ring 23 incorporates a pair of out-turned portions 25 disposed one to each side of the gap 21. The out-turned portions 25 diverge in the outward direction to provide a guideway which facilitates entry of the gas cylinder 13 into the opening 18 within the body 15.

If desired, the inner face of the clamping ring portion 23 may be provided with a lining for enhancing frictional engagement between the restraining device and the gas cylinder. The lining may be of a permanent or removable form. A securing device 27 is provided for releasably securing the free ends of the side portions 19 together. In this embodiment, the securing means 27 is in the form of a strap means comprising two straps 29 each connected to the free end of one of the side portions 19 by way of an anchoring element 31 hingedly mounted on a reinforced portion 33 of the respective side portion 19. A buckle 35 is provided for releasably connecting the two straps 29 together. The buckle is adjustably mounted onto one of the straps 29 so that the effective length of the strap means can be varied according to the desired size of the gap 21.

The base 17 of the body comprises an elongated base portion 41 having an inner longitudinal face 43 and an outer longitudinal face 45. The clamping ring portion 23 is mounted on the inner longitudinal face 43 of the base portion 41 at a region intermediate the ends thereof. The clamping ring portion 23 is mounted on the base portion 41 by way of a bridging portion 47 which extends between the base portion and the clamping ring portion, and reinforcing webs 49 disposed one to each side of the bridging portion 47 and also extending between the base portion and the clamping ring portion.

The side portions 19 each include a support arm 51 which extends between the respective end of the base portion 41 and the clamping ring portion 23.

The reinforcing webs 49 merge with the support arms 51 to provide a reinforcing structure between the support arms and the base portion. An aperture 53 is provided in each reinforcing web 49 for a purpose which will be explained later.

The outer longitudinal face 45 of the base portion 41 is adapted for location against a support surface which as previously mentioned may be the load carrying tray of motor vehicle or a side wall thereof. The outer longitudinal face 45 is provided with end sections 55 adapted for engagement with the support surface and an intermediate section 57 disposed between the end sections. The outer sections 55 are each inclined inwardly in the direction towards the adjacent end of the base portion. The intermediate section is recessed for the purpose of avoiding contact with the support surface upon deformation of the base in a manner to be described later. The outer sections 55 are provided with a tread structure 59 to facilitate frictional contact between the end sections 59 and the support surface.

Recesses 61 are provided in the longitudinal side faces of the base portion 41 for the purpose of weight reduction and to facilitate deformation of the base portion.

The restraining device according to the embodiment can be employed to restrain a gas cylinder against rolling when it is supported in a prone position on a support surface such as the load carrying tray of a vehicle. In this application of the restraining device, it is preferable that two such restraining devices be employed at spaced apart positions along the gas cylinder, as shown in FIG. 1 of the drawings. With this arrangement, each restraining device is placed on the gas cylinder 13 by pulling on the two side portions 19 to expand the gap 21 so that the restraining device can be positioned on the cylinder with the body of the cylinder received within the clamping opening 18. The side portions 19 are then released and the buckle of the strap means 27 assembled so as to secure the two ends of the side portions 19 together. The strap means 27 is subsequently tightened to enhance the clamping action on the cylinder. The outer sections 55 of the base portion 41 rest on the support surface and maintain frictional contact with the surface by virtue of the tread structure 59. In this way, the restraining devices serve to restrain the cylinder from rolling, particularly while the vehicle is in motion. There may be occasions when the restraining devices do slide across the load carrying tray of the vehicle but in such cases the restraining devices serve as a buffer which reduces the likelihood of the cylinder coming into contact with another object.

The restraining device can also be employed to restrain movement of a gas cylinder being transported in a upright position. As was the case when transporting the gas cylinder in a prone position, it is preferable that two restraining devices be employed. Each restraining device is positioned on the gas cylinder in the manner previously described and the gas cylinder is then arranged in the upright position with the outer sections 55 of the base portion 41 bearing against a support surface which in this case may be the side wall of the load carrying tray of a vehicle. The restraining devices can then be secured in position in any suitable way such as by means of ropes or chains passing through the apertures 53 in the body of the each restraining device.

Figure 5:
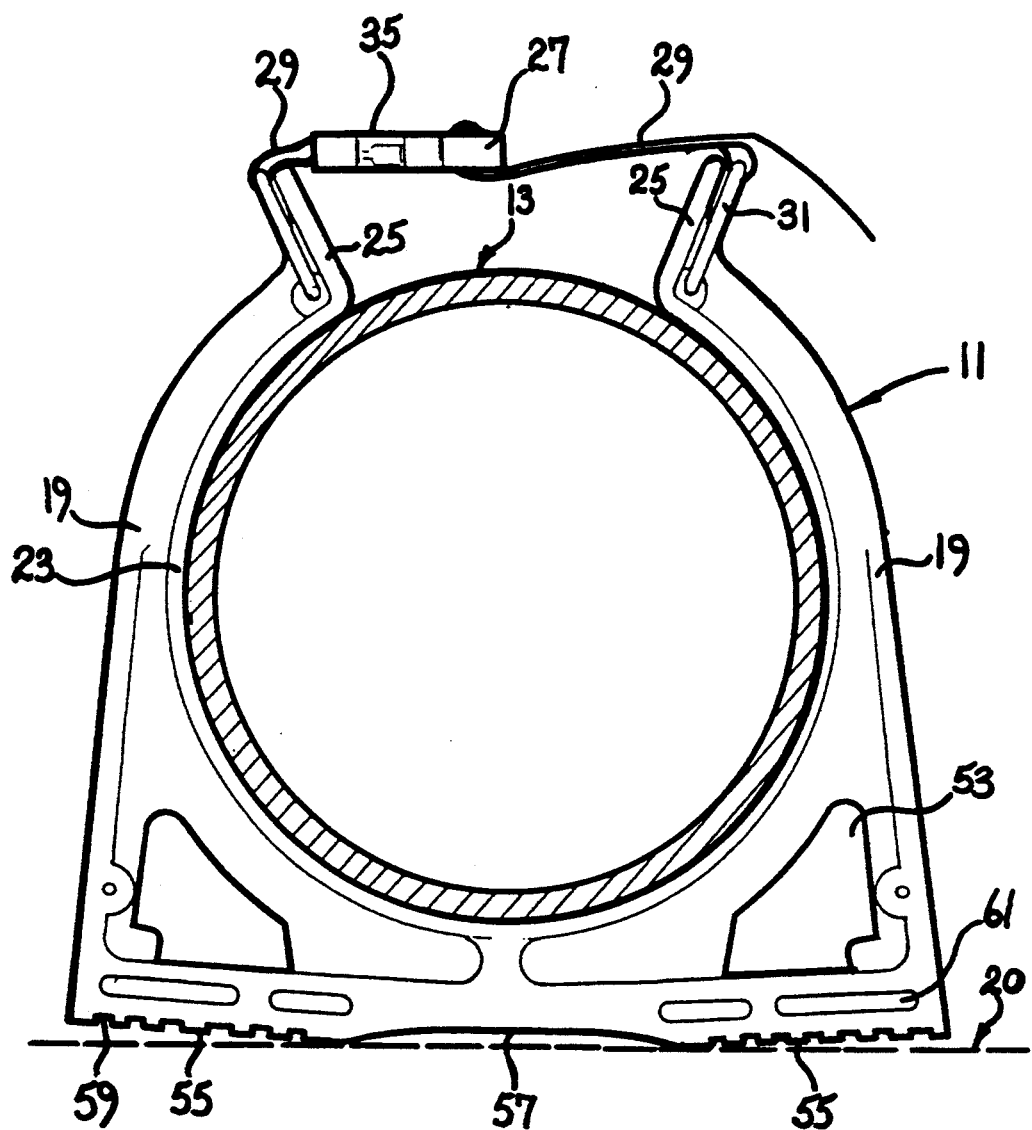
FIG. 5 is a view of the restraining device fitted on to a gas cylinder (shown in section) of approximately the same diameter as the clamping opening defined within the restraining device.
Figure 6:
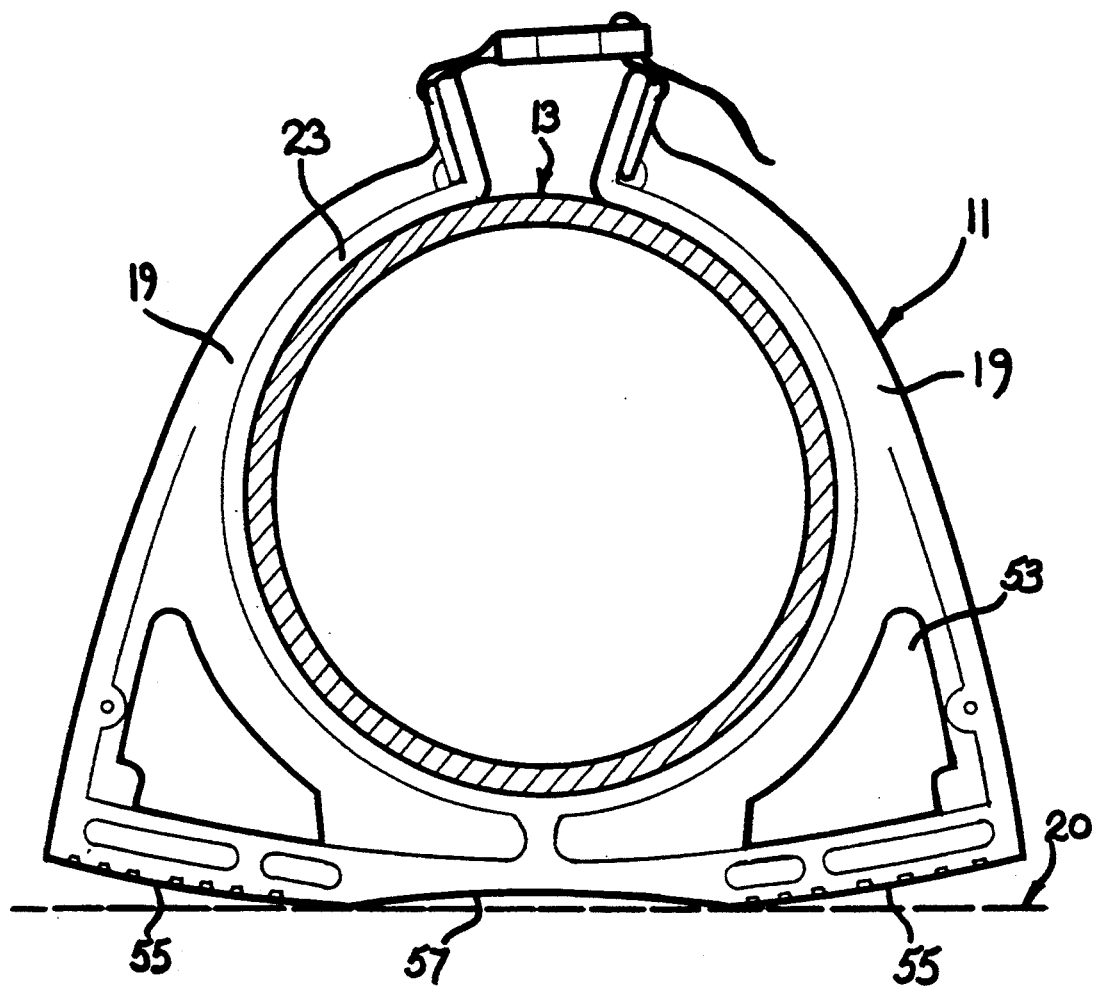
FIG. 6 is a view similar to FIG. 5 with the exception that the restraining device is shown fitted onto a gas cylinder of smaller diameter than the clamping opening defined within the restraining device.
Figure 7:
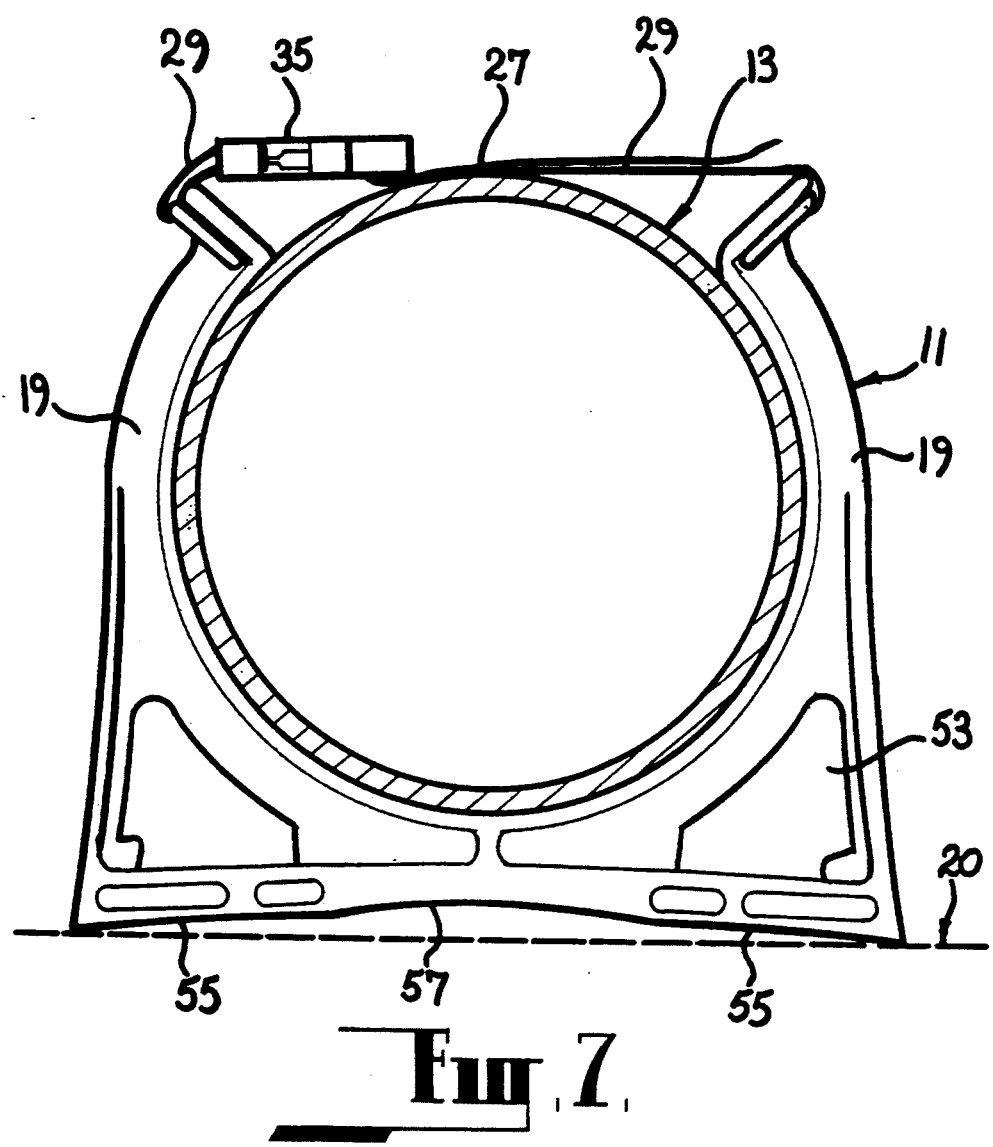
FIG. 7 is also a view similar to FIG. 5 with the exception that the restraining device is shown fitted onto a cylinder of larger diameter than the opening defined within the restraining device.

Because of the ability of the body of the restraining device to deform, it is not necessary for the gas cylinder to have an outside diameter which is exactly the same as the inside diameter of the clamping ring portion 23. Indeed, because of the flexibility of the body, the restraining device can accommodate gas cylinders which are somewhat smaller and larger than the inside diameter of the clamping ring portion 23. This feature will now be described with reference to FIGS. 5, 6 and 7 of the accompanying drawings. In FIG. 5, the gas cylinder has an outside diameter which is substantial equal to the inside diameter of the clamping ring portion 23 and in such a case there is no significant deformation of the base 17. When the restraining device is fitted onto the cylinder referring now to FIG. 6, there is illustrated an arrangement where the diameter of the cylinder is somewhat smaller than the inside diameter of the clamping ring portion 23 of the restraining device. In this situation, the strap means 27 is employed to pull the side portions 19 towards each other so as to effect a clamping action onto the gas cylinder. This results in deformation of the base 17 and in particular the base portion 41 with the result that contact between the base portion and the support surface is at the inner extremities of the outer sections 55. At this stage, the base is still in stable contact with the support surface; the recessed nature of the intermediate section 57 ensures that the intermediate section does not come in contact with the support surface. If the intermediate section 57 did in fact come in contact with the support surface, it would be likely to cause some instability as it would tend to provide a fulcrum about which the restraining device may rock. Finally referring now to FIG. 7, there is illustrated an arrangement where the outside diameter of the gas cylinder is somewhat larger than the inside diameter of the clamping ring 23 with the result that the side portions 23 are deflected outwardly and the base 17 is deformed such that contact with the support surface is at the outer extremities of the outer sections 55.

The recessed nature of the intermediate section 57 of the base portion has a further benefit in that it serves to enhance the clamping action of the clamping ring portion on the gas cylinder, particularly when the gas cylinder is supported in a prone position. This benefit arises because the weight of the gas cylinder is transmitted to the base portion 41 by way of the bridging portion 47 which is in opposed relationship to the intermediate section 57. The effect of this is to cause the intermediate section 57 to be deflected in the direction towards the support surface with the result that the side portion 19 of the body are caused to deflect inwardly into contact with the gas cylinder.

Figure 8:
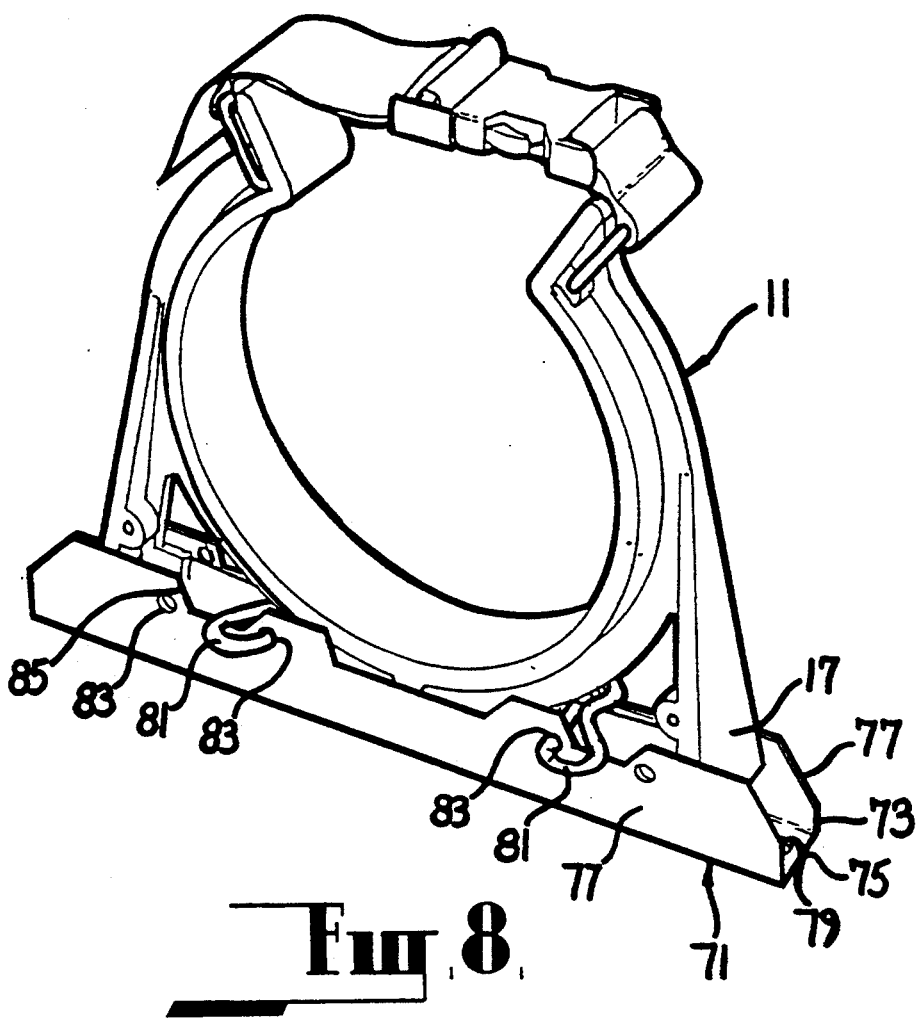
FIG. 8 is a perspective view of the restraining device according to the first embodiment in combination with a locating means to which the restraining device is releasably connected.
Figure 9:
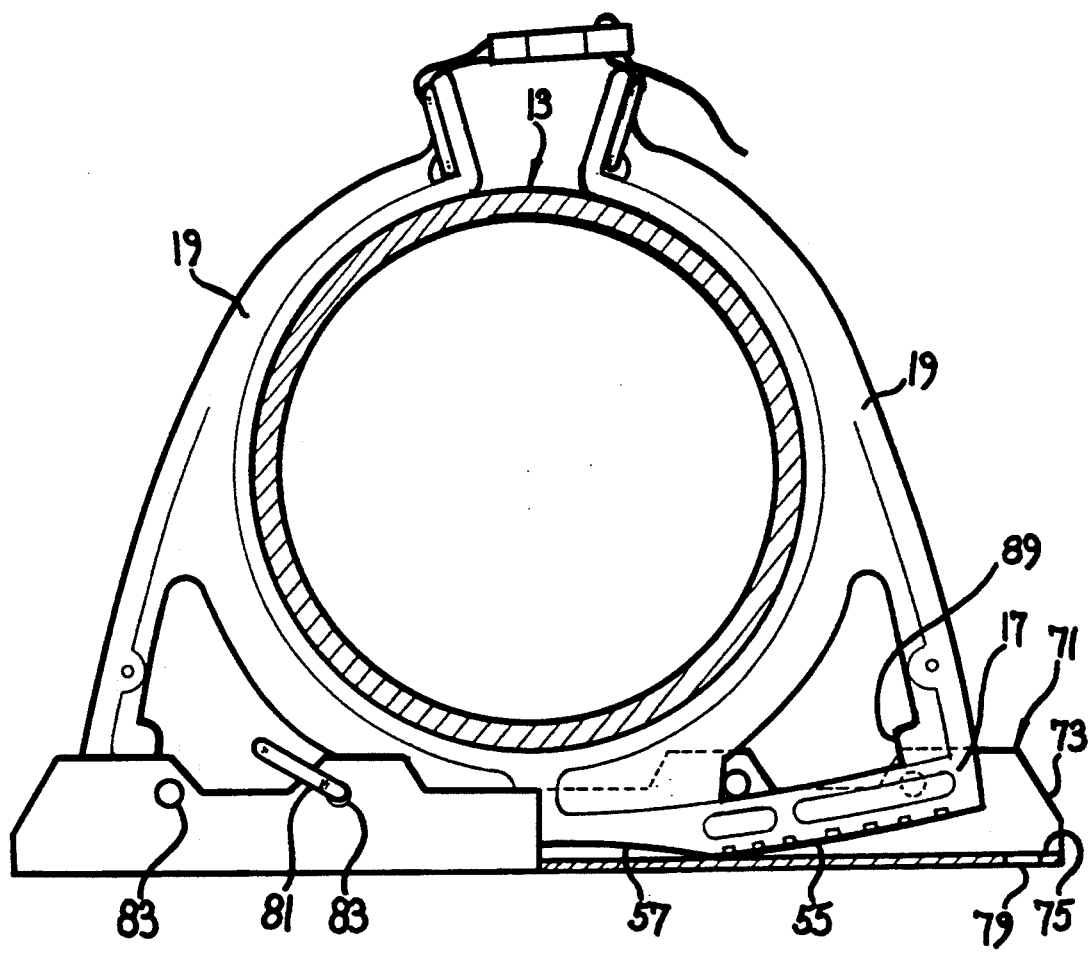
FIG. 9 is a front view of the combination of the restraining device and locating means of FIG. 8, with the restraining means being shown fitted onto a gas cylinder of diameter smaller than the clamping opening defined within the restraining device and with part of the locating means cut away to show deformation of the base of the restraining device.
Figure 10:
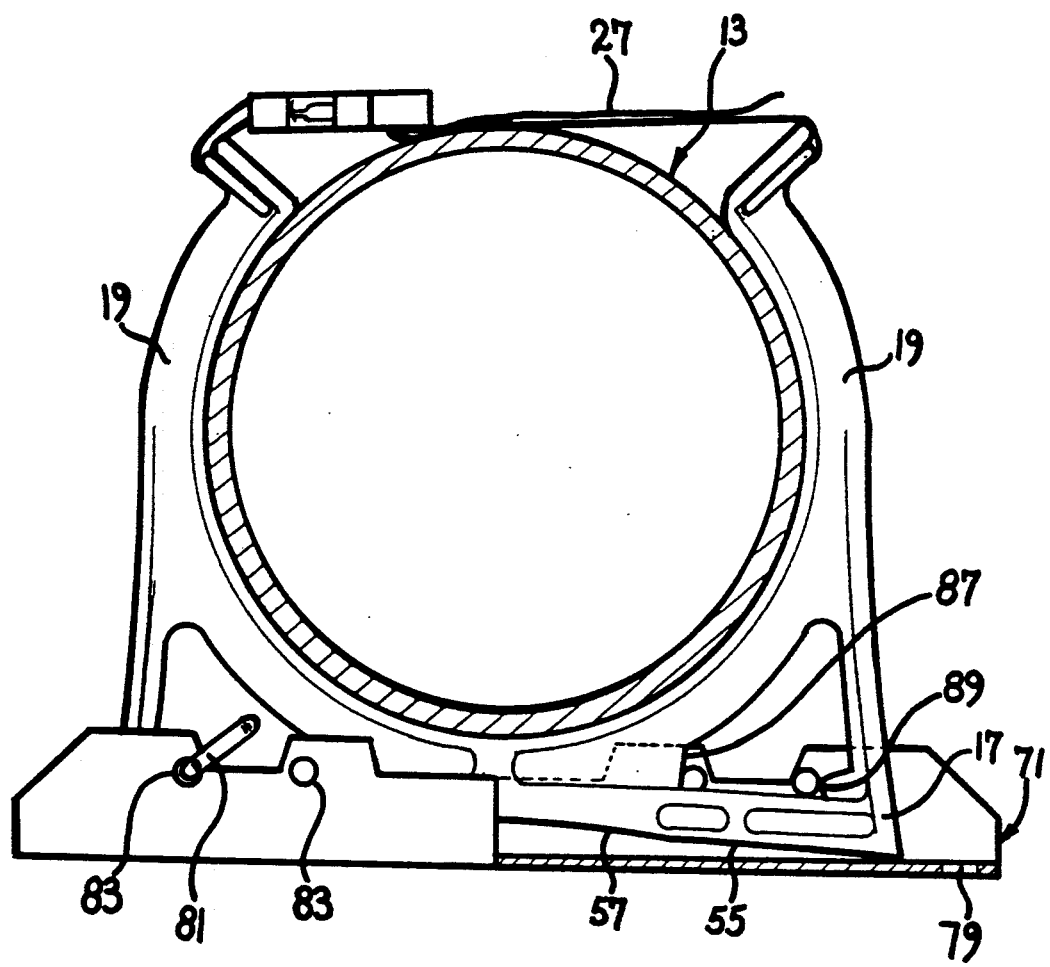
FIG. 10 is a view similar to FIG. 9 with the exception that the restraining device is shown fitted onto a cylinder of diameter larger than the clamping opening within the restraining device.

In the embodiment described previously, the restraining device has simply been placed against the support surface regardless of whether the gas cylinder is arranged in an upright position or a prone position. In either case, the restraining device can be anchored in position if desired by any suitable means such as ropes or chains passing through the apertures 53 in the body. An alternative means for anchoring the restraining device in a stable position is illustrated in FIGS. 8, 9 and 10 of the accompanying drawings and comprises a locating means 71 adapted to receive and releasably retain the base portion of the restraining device. The locating means 71 comprises a channel member 73 having a base 75 and a pair of side walls 77. The locating means is adapted to be secured to another object (such as a part of a vehicle) by way of securing bolts which can pass through apertures 79 provided in the base 75 of the channel member. The base of the restraining device is releasably retained within the channel member by way of removable clips 81 which pass through sets of aligned holes in the side walls 77 of the channel. The clips are arranged to extend through the apertures 53 in the body 15 of the restraining device at a location disclosed closely adjacent the inner longitudinal face 43 of the base portion 41. In this embodiment, the channel is provided with four sets of locating holes and typically two clips would be employed to locate the restraining device in position, one clip passing through each aperture 53. The sets of holes are arranged so that the clips can be positioned either adjacent a bearing surface 87 at the inner extremity of each aperture 53 (as shown in FIG. 9 of the drawings) or adjacent a bearing surface 89 at the outer extremity of each aperture 53 (as shown in FIG. 10 of the drawings). The choice as to the particular location of the clips is dependent on the size of the gas cylinder to be restrained. Where, for example, the gas cylinder has an outside diameter which is smaller than the inside diameter of the clamping ring portion 23 of the restraining device, the clips would be located adjacent the inner extremities of the apertures 53 (as shown in FIG. 9) to permit the side portions 19 of the body to deflect inwardly into clamping engagement with the gas cylinder. On the other hand, where the gas cylinder has an outside diameter which is larger than the inside diameter of the clamping ring portion 23, the clips would be located adjacent the outer extremities of the apertures (as shown in FIG. 10). If the cylinder is of approximately the same size as the clamping ring portion, the choice is not important but more stability can be achieved if the clips are located against the outer extremities.

The bearing surfaces 87, 89 are shaped to accommodate deflections of the base portion 41 towards and away from the base (the channel member. Additionally contact between the clips and the respective bearing surface stops sideways movement of the restraining device along the length of the channel.

Figure 11:
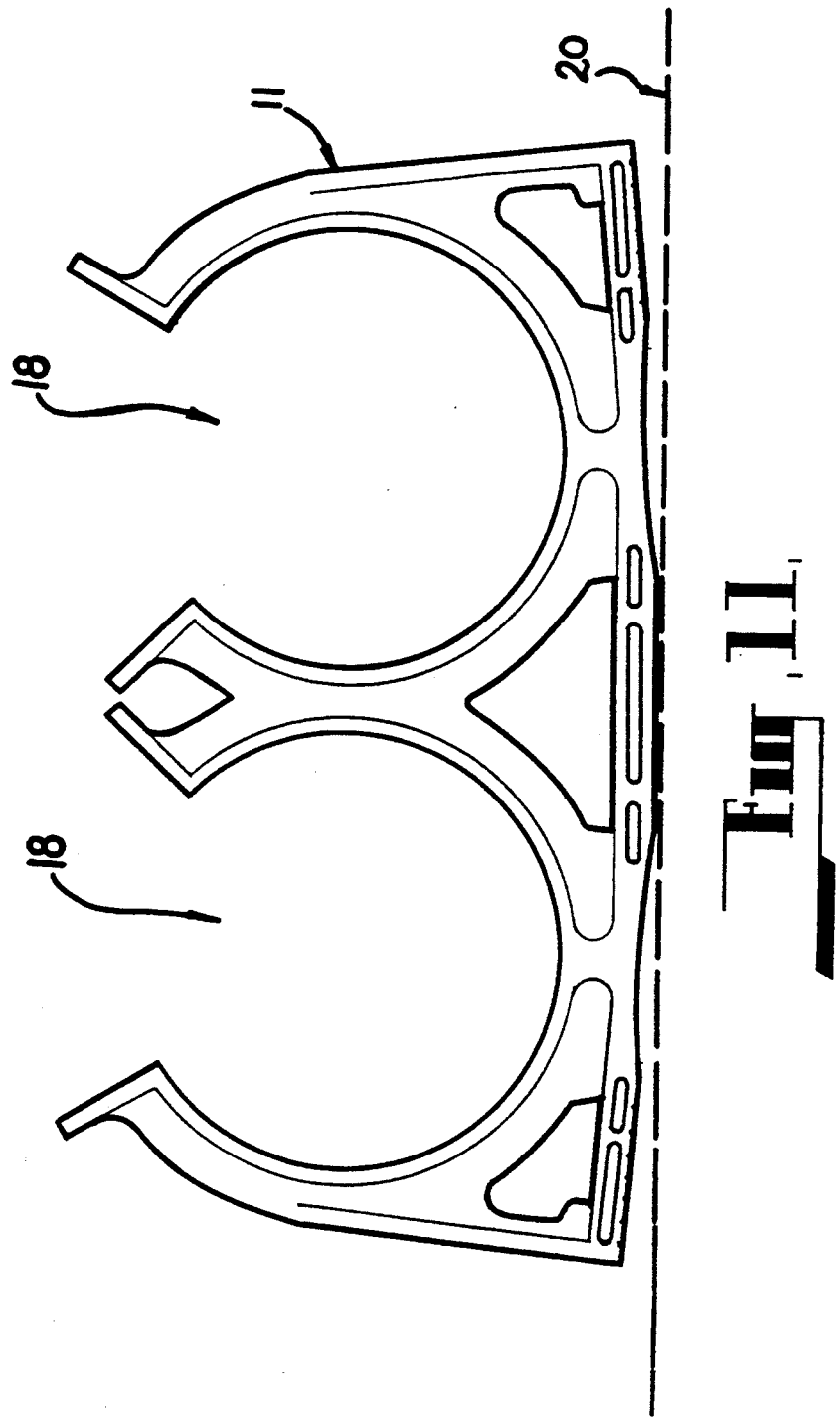
FIG. 11 is a front view of a restraining device according to a further embodiment.

The upper edge of each side wall 77 is provided with recessed portions 85 to provide clearance for the clips. A further embodiment of the invention is shown in FIG. 11. The restraining device of this embodiment is provided with several clamping openings 18 for receiving and retaining more than one gas cylinder.

It should be appreciated that the scope of the invention is not limited to the scope of the embodiment described. For instance the restraining device may be incorporated into a trolley or other device for storing and transporting gas cylinders and other objects. Additionally, the restraining device may be employed to restrain objects other than gas cylinders, particularly elongated objects which are round.

We claim:

1. A restraining device for an object comprising a body having a base for location against a support surface and a pair of side portions extending from said base, said base and said side portions being formed from a resilient material and defining an opening capable of expansion and contraction for receiving and clampingly retaining said object, said base being deformable to define spaced apart sections for engaging and maintaining stable contact with said support surface upon expansion and contraction of said opening through deformation of said side portions and said base, the point of contact of said spaced apart sections with the support surface varying with deformation of said side portions and said base so as to provide a spaced apart contact with the support surface with the points of contact being spaced apart a greater distance as the object received is increased in size, said base and said side portions co-operating to define a clamping ring portion forming a periphery of said opening of variable size to accommodate different sized objects, said base comprising an elongated base portion and said ring portion being mounted on the inner longitudinal face of said base portion at a region intermediate the ends thereof.

2. A restraining device according to claim 1 wherein said side portions have free ends remote from said base which are spaced apart relationship to define a gap through which said object can be inserted into and removed from said opening, the size of said gap varying with expansion and contraction of said opening.

3. A restraining device according to claim 2 wherein a securing device is provided for releasably securing the free ends of the side portions together.

4. A restraining device according to claim 1 wherein said side portions and said base are formed integrally.

5. A restraining device according to claim 4 wherein said body is formed of resilient material.

6. A restraining device according to claim 5 wherein the said portions include a pair of support arms disposed one to each side of said side intermediate region of the base portion, each support arm extending from the base portion towards the clamping ring.

7. A restraining device according to claim 6 wherein an aperture is defined between said base portion, said clamping ring and each of said support arms.

8. A restraining device according to claim 1 wherein the outer longitudinal face of said base portion is provided with inclined end sections adapted for engagement with said support surface and an intermediate section disposed between said end sections, said intermediate section being recessed to avoid contact with said support surface upon deformation of said base.

9. A restraining device according to claim 8 wherein each of said end sections is provided with a tread structure.

10. A combination of a restraining device as set forth in claim 1 and a locating means adapted to receive and releasably retain said base of said restraining device, said locating means comprising said support surface.

11. A combination according to claim 10 wherein said locating means includes a channel portion for receiving said base portion of said restraining device.

12. A combination according to claim 11 wherein said locating means further includes at least one locking element engagable with said channel for releasably retaining said base portion in the channel.

13. A combination according to claim 12 wherein there are two of said locking elements each adapted to pass through a respective one of said apertures in the body of said restraining device.

* * * * *